United States Patent [19]

Aso

[11] Patent Number: 4,889,379
[45] Date of Patent: Dec. 26, 1989

[54] ARRANGEMENT FOR SUPPORTING AND ADJUSTING SEATS IN VEHICLES

[75] Inventor: Seiichi Aso, Higashihiroshima, Japan

[73] Assignee: Mazda Motor Corporation, Hiroshima, Japan

[21] Appl. No.: 150,149

[22] Filed: Jan. 29, 1988

[30] Foreign Application Priority Data

Feb. 6, 1987 [JP] Japan .................................. 62-26942

[51] Int. Cl.$^4$ ............................................. B60N 1/08
[52] U.S. Cl. .................................... 296/65.1; 248/430
[58] Field of Search ............... 296/63, 65 R; 248/249, 248/430, 503.1

[56] References Cited

U.S. PATENT DOCUMENTS

| 2,919,744 | 1/1960 | Tanaka | 296/65 R X |
| 3,476,435 | 11/1969 | Hitzelberger | 296/65 R |
| 4,372,607 | 2/1983 | Mizushima et al. | 297/331 X |
| 4,451,078 | 5/1984 | Maeda | 296/65 A |
| 4,645,159 | 2/1987 | Terada et al. | 248/429 |
| 4,685,716 | 8/1987 | Kondo | 296/65 R X |

FOREIGN PATENT DOCUMENTS

| 60-81134 | 5/1985 | Japan . | |
| 884266 | 12/1961 | United Kingdom | 296/65 R |

Primary Examiner—Dennis H. Pedder
Attorney, Agent, or Firm—Gerald J. Ferguson, Jr.

[57] ABSTRACT

An arrangement for supporting and adjusting a seat in a vehicle comprises a part of a floor panel including a floor tunnel which extends in the longitudinal direction of a vehicle body, a sliding support member mounted on the portion of the floor panel to be movable along the floor tunnel for supporting and sliding the seat, and a seat driving mechanism disposed on the floor tunnel and including a connecting member extending from the floor tunnel to be coupled with the sliding support member for moving the sliding support member along the floor tunnel through the connecting member so as to adjust a position of the seat in the longitudinal direction of the vehicle body.

19 Claims, 3 Drawing Sheets

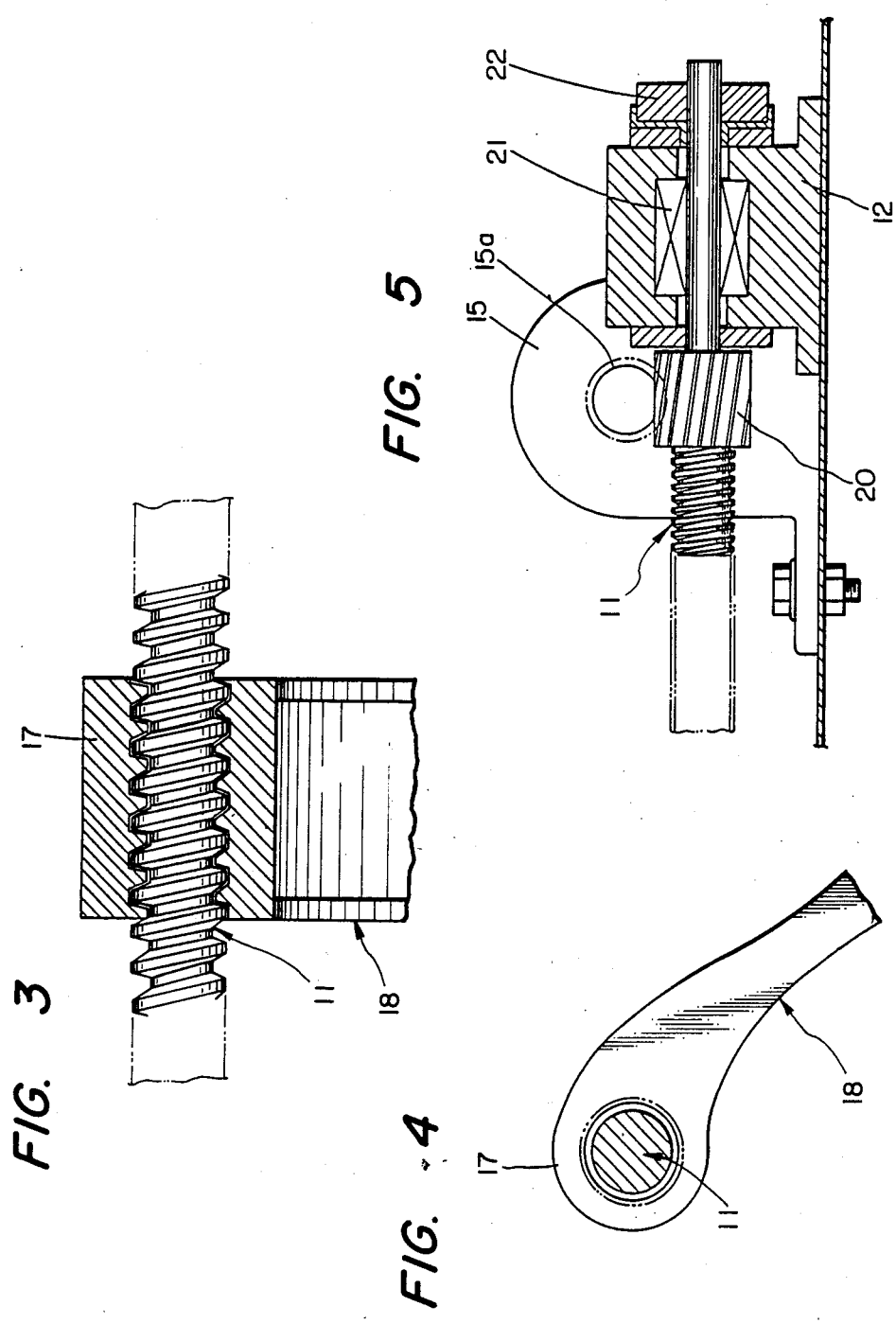

ARRANGEMENT FOR SUPPORTING AND ADJUSTING SEATS IN VEHICLES

BACKGROUND OF THE INVENTION

1. Field of the Invention

The present invention relates generally to arrangements for supporting and adjusting seats in vehicles, and more particularly, is directed to an improvement in an arrangement for supporting a seat in a vehicle to be movable in a direction of the length of a vehicle body and adjusting a position of the seat.

2. Description of the Prior Art

In general, a front seat provided in a vehicle is mounted through a sliding mechanism on a floor panel of a vehicle body so as to be slid for positional adjustment in a direction of the length of the vehicle body. The positional adjustment of the front seat in the vehicle may be carried out manually by a driver who takes the front seat and intend to obtain more comfortable condition on the front seat.

For adjusting the position of the front seat in the vehicle, the driver is required to have a relatively uneasy manual labor in a narrow space on the front seat. Accordingly, for the purpose of release the driver from such troublesome adjusting job, there has been proposed a power front seat system in which a front seat is driven to slide for positional adjustment thereof by a motor operative with electric power supplied from a battery provided in the vehicle or a generator driven by an engine of the vehicle, and the power front seat system is now apt to be widespread among passenger vehicles.

In the power front seat system, it is usual that a driving unit including the motor is disposed under a seat cushion of the front seat, as shown in the Japanese utility model application published before examination under publication number 60/81134. Such a structure that the driving unit is put in a space under the seat cushion results in a problem that the driving unit prevents the front seat used in the power front seat system from being lowered even though the front seat is required to be positioned as low as possible. Further, since the space under the seat cushion of the front seat cannot be formed to be large enough usually, there is another disadvantage that a specific driving unit which is designed to be especially compact is necessary and it is not easy to place the driving unit under the seat cushion of the front seat.

OBJECTS AND SUMMARY OF THE INVENTION

Accordingly, it is an object of the present invention to provide an arrangement for supporting and adjusting a seat in a vehicle, which avoids the foregoing problem and disadvantage encountered with the prior art.

Another object of the present invention is to provide an arrangement for supporting and adjusting a seat in a vehicle, with which the seat positioned relatively low on a vehicle body is moved to slide for positional adjustment thereof in a direction of the length of the vehicle body.

A further object of the present invention is to provide an arrangement for supporting and adjusting a seat in a vehicle, in which the seat positioned relatively low on a vehicle body is moved to slide for positional adjustment thereof by a seat driving mechanism disposed at a position on the vehicle body other than a space under the seat.

A still further object of the present invention is to provide an arrangement for supporting and adjusting a seat in a vehicle, in which a seat driving mechanism for moving the seat to slide for positional adjustment thereof in a direction of the length of a vehicle body can be mounted easily on the vehicle body.

According to the present invention, there is provided an arrangement for supporting and adjusting a seat in a vehicle, which comprises a part of a floor panel of a vehicle body including a portion forming a floor tunnel which extends in a direction of the length of the vehicle body, a sliding support member mounted on the portion of the floor panel side by side with the floor tunnel to be movable along the floor tunnel for supporting and sliding the seat, and a seat driving mechanism disposed on the floor tunnel and including a connecting member extending from the floor tunnel to be coupled with the sliding support member for moving the sliding support member along the floor tunnel through the connecting member so as to adjust a position of the seat in the direction of the length of the vehicle body.

In the arrangement thus constituted in accordance with the present invention, the sliding support member supports the seat provided thereon, which may be a front seat, so that the seat is slid together with the sliding support member in the direction of the length of the vehicle body. In case of positional adjustment of the seat, the seat driving mechanism is operative to move the connecting member along the floor tunnel and consequently the sliding support member which is coupled with the connecting member is moved along the floor tunnel so as to cause the seat to slide and thereby to adjust the position of the seat.

With this arrangement, since the seat driving mechanism is disposed on the floor tunnel and the sliding support member on which the seat is mounted without any driving means placed thereunder is moved through the connecting member included in the seat driving mechanism to extend from the floor tunnel, the seat can be positioned as low as possible on the floor panel of the vehicle body. Further, there is usually a sufficient space on the floor tunnel and therefore the seat driving mechanism is installed quite easily on the floor tunnel. A main part of the seat driving mechanism placed on the floor tunnel may be contained in a console structure which is provided to cover the floor tunnel, so that a fine interior appearance of the vehicle is obtained.

The above, and other objects, features and advantages of the present invention will become apparent from the following detailed description which is to be read in conjunction with the accompanying drawings.

BRIEF DESCRIPTION OF THE DRAWINGS

FIGS. 3, 4 and 5 are schematic illustrations showing different portions of a seat driving mechanism used in the embodiment shown in FIG. 1, respectively.

DESCRIPTION OF THE PREFERRED EMBODIMENT

Now, an embodiment of arrangement for supporting and adjusting a seat in a vehicle according to the present invention will be described in detail with reference to the accompanying drawings.

Figure 1:
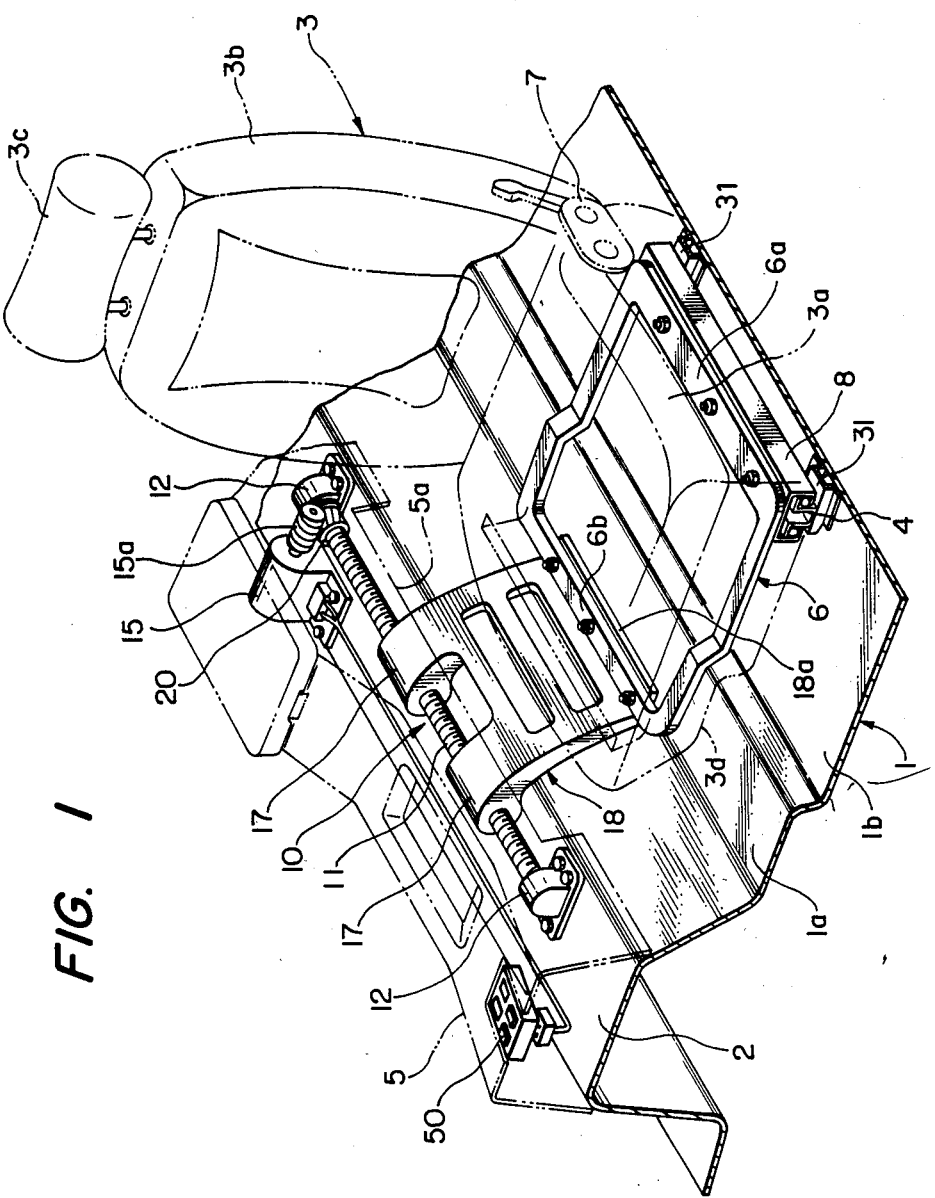
FIG. 1 is a schematic perspective view showing an embodiment of arrangement for supporting and adjusting a seat in a vehicle.
Figure 2:
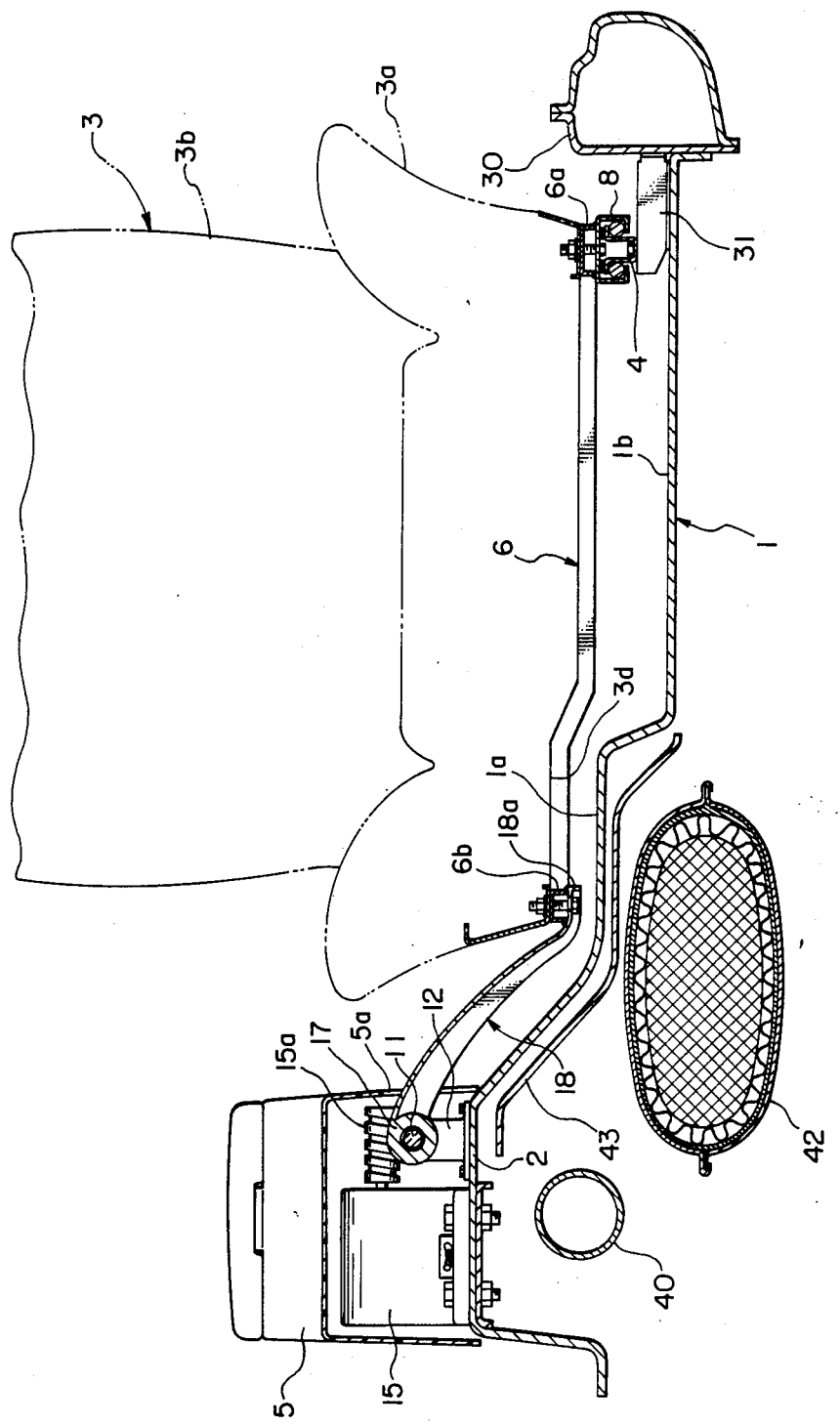
FIG. 2 is a schematic cross-sectional view showing a portion of the embodiment shown in FIG. 1.

FIGS. 1 and 2 show schematically one example of the arrangement for supporting and adjusting a seat in a vehicle according to the present invention in its entirety, and each of FIGS. 3, 4 and 5 shows a part of a driving mechanism employed in the example and shown in FIGS. 1 and 2.

Referring to FIGS. 1 and 2, a part of a floor panel 1 of a vehicle body comprises a portion forming a floor tunnel 2 projecting upward and extending in a direction of the length of the vehicle body, a protuberant portion 1a formed to be contiguous to and extend along the floor tunnel 2 with the height lower than that of the floor tunnel 2, and a flat portion 1b extending from the protuberant portion 1a. Under the floor tunnel 2 and the protuberant portion 1a of the floor panel 1, a propeller shaft 40 is positioned to extend in the direction of the length of the vehicle body and a catalytic converter 42 which constitutes an exhaust emission control system is also disposed with a heat insulating member 43 placed over the catalytic converter 42. Further, a console structure 5 is installed on the floor tunnel 2 to cover the same and a seat 3 which is, for example, one of front seats provided in a vehicle is placed on the protuberant portion 1a and the flat portion 1b of the floor panel 1.

The seat 3 is composed of a seat cushion 3a, a seat back 3b attached through a hinge device 7 to a rear end portion of the seat cushion 3a and a headrest 3c provided on the seat back 3b to be movable vertically. The seat cushion 3a is fixed on a sliding support member 6 which is formed into a frame work and disposed above the protuberant portion 1a and the flat portion 1b of the floor panel 1. An outer side portion 6a of the sliding support member 6, which is one of side portions of the sliding support member 6 on the side of the outside of the vehicle body, is attached to an engaging member 8 engaged with a rail guide member 4, which is supported by brackets 31 provided to be connected to both the flat portion 1b of the floor panel 1 and a side sill 30, to be movable along the rail guide member 4 in the direction of the length of the vehicle body. The seat cushion 3a is provided on its bottom with a stepped portion 3d facing the protuberant portion 1a of the floor panel 1.

On the floor tunnel 2, a seat driving mechanism 10 is disposed in such a manner that a main part of the seat driving mechanism 10 is contained in the console structure 5. The seat driving mechanism 10 comprises a feed screw shaft 11 extending along the floor tunnel 2 and supported rotatably at its both end portions by bearing brackets 12, a motor 15 for rotating the feed screw shaft 11, and a connecting member 18 engaged movably with the feed screw shaft 11.

As shown in FIG. 5, the bearing bracket 12 is provided with a roller bearing 21 in its inside for supporting an end portion of the feed screw shaft 11 to be rotatable. The end portion of the feed screw shaft 11 is provided with a stopper nut 22. The motor 15 is provided on its rotating shaft with a worm gear 15a which engages with a helical gear 20 fixed on the feed screw shaft 11, so that the feed screw shaft 11 is rotated in accordance with the rotations of the motor 15 at a predetermined speed in a predetermined rotating direction. The motor 15 is controlled to rotate clockwise or counterclockwise by a control switch 50 provided on an upper portion of the console structure 5.

The connecting member 18 has a couple of nut portions 17 provided at its upper side part and a lower side part 18a thereof connected with the sliding support member 6. The upper side part of the connecting member 18 is forked into two branches in each of which the nut portion 17 is formed, and each of the nut portion 17 engages with the feed screw shaft 11 inserted thereinto, as shown in FIGS. 3 and 4, so that the connecting member 18 is engaged with the feed screw shaft 11 with the nut portions 17 which are distant a relatively small distance from each other in the direction along the feed screw shaft 11 and moved along the feed screw shaft 11 by means of the rotations of the feed screw shaft 11. Further, the connecting member 18 is made of metal plate material with relatively high rigidity and disposed to extend downward from the floor tunnel 2 to the outside of the console structure 5 through a cutout 5a formed on the console structure 5 so that the lower side part 18a of the connecting member 18 is coupled with an inner side portion 6b of the sliding support member 6, which is another of the side members of the sliding support member 6 on the side of the center of the vehicle body, at a position above the protuberant portion 1a of the floor panel 1.

With the configuration described above, the seat 3 is supported at an appropriate level by the sliding support member 6 which has the outer side portion 6a thereof supported through the engaging member 8 by the rail guide member 4 to be movable in the direction of the length of the vehicle body and the inner side portion 6b supported by the lower side part 18a of the connecting member 18 to be moved along the floor tunnel 2 by the rotations of the feed screw shaft 11, and is slid in accordance with movements of the sliding support member 6 in the direction of the length of the vehicle body.

Then, when the control switch 50 is turned on to cause the motor 15 to rotate, the feed screw shaft 11 is rotated through the worm gear 15a and the helical gear 20 by the motor 15 so as to move the connecting member 18 and the sliding support member 6 coupled with the connecting member 18 along the feed screw shaft 11, and consequently the seat 3 is slid by the sliding support member 6 in the direction of the length of the vehicle body, so that positional adjustment of the seat 3 is performed in the vehicle.

In embodiment described above, since the connecting member 18 is engaged with the feed screw shaft 11 by means of two nut portions 17 which are distant the relatively small distance from each other in the direction along the feed screw shaft 11 so as to be moved smoothly along the feed screw shaft 11, the seat 3 is smoothly slid to be easily adjusted in position. Further, although the protuberant portion 1a of the floor panel 1 is provided, the seat 3 is not required to be positioned undesirably high in the vehicle body.

What is claimed is:

1. An arrangement for supporting and adjusting a seat in a vehicle, the arrangement comprising:

a part of a floor panel of a vehicle body including a portion thereof forming a floor tunnel which extends in a direction of the length of the vehicle body, a sliding support member mounted on said part of the floor panel for supporting and sliding the seat, said sliding support member being placed between the floor tunnel and a side sill connected to a side portion of the floor panel on the side of the outside of the vehicle body and movable in the direction of the floor tunnel together with the seat provided on said sliding support member; and a seat driving mechanism for adjusting a position of the seat in the direction of the length of a vehicle body, said seat driving mechanism including a motor disposed on a top portion of the floor tunnel, rotatable member disposed on a top portion of the floor tunnel and driven by said motor, and a connecting member engaged at a first edge portion thereof with said rotatable member and engaged at a second edge portion thereof with said sliding support member so as to be driven by said rotatable member for moving sid sliding support member along the floor tunnel.

2. An arrangement according to claim 1, wherein said first edge portion of the connecting member is forked into two branches each engaging with said rotatable member.

3. An arrangement according to claim 1, wherein said sliding support member is supported at one side portion thereof by a guide member provided on the side portion of the floor panel and also supported at another side portion thereof on the side of the center of the vehicle body by said second edge portion of the connecting member.

4. An arrangement according to claim 1, wherein said part of the floor panel further includes a protuberant portion formed to be contiguous to and extend along the floor tunnel.

5. An arrangement according to claim 4, wherein said protuberant portion is positioned to cover an exhaust emission control system provided under the floor panel.

6. An arrangement according to claim 4, wherein said protuberant portion is positioned to face a stepped portion formed on the bottom of the seat.

7. An arrangement according to claim 4, wherein said second edge portion of the connecting member is coupled with said sliding support member at a position above said protuberant portion.

8. An arrangement according to claim 1, wherein a seat cushion of the seat is fixed on said sliding support member to be placed between the floor tunnel and the side sill of the vehicle body, and said sliding support member is supported at that portion close to the side sill by a rail guide member to be movable in the direction of the length of the vehicle body, said rail guide member being disposed on said part of the floor panel to be lower than said seat driving mechanism.

9. An arrangement according to claim 1, wherein said motor and rotatable member are contained within a console structure provided on the floor tunnel to cover said motor and rotatable member.

10. An arrangement according to claim 9, wherein said connecting member is disposed to extend from the floor tunnel to the outside of the console structure through a cutout formed on the console structure.

11. An arrangement according to claim 1, wherein said connecting member is disposed to extend downward along a side wall portion of the floor tunnel.

12. An arrangement according to claim 1, wherein said rotatable member comprises a rotatable feed screw shaft.

13. An arrangement according to claim 12, wherein said motor and rotatable member are contained in a console structure provided on the floor tunnel to cover said motor and rotatable member.

14. An arrangement for supporting and adjusting a seat in a vehicle, the arrangement comprising:
a part of the floor panel of a vehicle body including a portion thereof forming a floor tunnel which extends in a direction of the length of the vehicle body,
a sliding support member mounted on said part of the floor panel for supporting and sliding the seat, said sliding support member being placed between the floor tunnel and a side sill connected to a side portion of the floor panel on the side of the outside of the vehicle body and movable in the direction of the floor tunnel together with the seat provided on said sliding support member; and
a seat driving mechanism for adjusting a position of the seat in the direction of the length of the vehicle body, said seat driving mechanism including a motor disposed on the floor tunnel, a rotatable member disposed on the floor tunnel and driven by said motor, and a connecting member engaged at a first edge portion thereof with said rotatable member and engaged at a second edge portion thereof with said sliding support member so as to be driven by said rotatable member for moving said sliding support member along the floor tunnel;
wherein said motor and said rotatable member are contained in a console structure provided on the floor tunnel to cover said motor and said rotatable member of said seat driving mechanism.

15. An arrangement according to claim 14, wherein said part of the floor panel further includes a protuberant portion formed to be contiguous to and extend along the floor tunnel.

16. An arrangement according to claim 15, wherein said protuberant portion is positioned to cover and exhaust emission control system provided under the floor panel.

17. An arrangement according to claim 15, wherein said protuberant portion is positioned to face a stepped portion formed on the bottom of the seat.

18. An arrangement according to claim 15, wherein said second edge portion of the connecting member is coupled with said sliding support member at a position above siad protuberant portion.

19. An arrangement for supporting and adjusting a seat in a vehicle, the arrangement comprising:
a part of a floor panel of vehicle body including a portion thereof forming a floor tunnel which extends in a direction of the length of the vehicle body,
a sliding support member mounted on said part of the floor panel for supporting and sliding the seat, said sliding support member being placed between the floor tunnel and a side sill connected to a side portion of the floor panel on the side of the outside of the vehicle body and movable in the direction of the floor tunnel together with the seat provided on said sliding support member; and
a seat driving mechanism for adjusting a position of the seat in the direction of the length of the vehicle body, said seat driving mechanism including a motor disposed on the floor tunnel, a rotatable member disposed on the floor tunnel and driven by said motor and a connecting member engaged at a first edge portion thereof with said rotatable member and engaged at a second edge portion thereof with said sliding support member so as to be driven by said rotatable member for moving said sliding support member along the floor tunnel;
wherein said motor and rotatable member are contained within a console structure provided on the floor tunnel to cover said motor and rotatable member and said connecting member is disposed to extend from the floor tunnel to the outside of said console structure through a cut out formed on said console structure.

* * * * *